US010927781B2

(12) United States Patent
Enderlin et al.

(10) Patent No.: US 10,927,781 B2
(45) Date of Patent: Feb. 23, 2021

(54) METHOD OF OPERATING A DRIVE OF A MINING MACHINE AND MINING MACHINE

(71) Applicant: Liebherr-Mining Equipment Colmar SAS, Colmar (FR)

(72) Inventors: Jerome Enderlin, Heimersdorf (FR); Lionel Oberhauser, Kolbsheim (FR)

(73) Assignee: LIEBHERR-MINING EQUIPMENT COLMAR SAS, Colmar (FR)

( * ) Notice: Subject to any disclaimer, the term of this patent is extended or adjusted under 35 U.S.C. 154(b) by 85 days.

(21) Appl. No.: 16/280,468

(22) Filed: Feb. 20, 2019

(65) Prior Publication Data
US 2019/0257258 A1  Aug. 22, 2019

(30) Foreign Application Priority Data

Feb. 20, 2018  (DE) .................... 10 2018 103 760.0

(51) Int. Cl.
| F01N 9/00 | (2006.01) |
| E02F 9/20 | (2006.01) |
| F02D 41/02 | (2006.01) |
| F01N 11/00 | (2006.01) |
| G07C 5/08 | (2006.01) |
| E02F 9/26 | (2006.01) |

(52) U.S. Cl.
CPC .......... *F02D 41/024* (2013.01); *E02F 9/2066* (2013.01); *F01N 11/00* (2013.01); *F02D 41/027* (2013.01); *G07C 5/0816* (2013.01); *E02F 9/26* (2013.01); *F01N 2570/12* (2013.01); *F02D 2200/021* (2013.01); *F02D 2200/0812* (2013.01); *F02D 2200/101* (2013.01)

(58) Field of Classification Search
CPC .. F02D 41/024; F02D 41/027; F02D 41/0082; F02D 41/0087; F02D 41/0245; F02D 41/1466; F02D 41/1446; F02D 41/144; F02D 2200/021; F02D 2200/101; F02D 2200/0812; F02D 2250/24; F02D 29/04; F02D 2041/026; E02F 9/26; E02F 9/2066; E02F 9/2246; F01N 11/00; F01N 2570/12; F01N 2560/02; F01N 3/10; F01N 3/021; F01N 2590/08; G07C 5/0816; G07C 5/08
See application file for complete search history.

(56) References Cited

U.S. PATENT DOCUMENTS

| 8,230,679 B2 | 7/2012 | Frazier et al. |
| 9,032,717 B2 | 5/2015 | Kwak et al. |
| 2004/0172935 A1* | 9/2004 | Otake .................... F02M 26/05 60/295 |

(Continued)

FOREIGN PATENT DOCUMENTS

| DE | 602004003404 T2 | 3/2007 |
| DE | 102007046564 A1 | 7/2008 |
| DE | 102008039590 A1 | 4/2009 |

*Primary Examiner* — Phutthiwat Wongwian
*Assistant Examiner* — Arnold Castro
(74) *Attorney, Agent, or Firm* — McCoy Russell LLP

(57) ABSTRACT

The disclosure relates to a method of operating a drive of a mining machine, in particular of a mining excavator, a mining loader, or a mining tipper, comprising at least one diesel engine and at least one exhaust gas purification device. The disclosure is further directed to a corresponding mining machine that can be operated in accordance with the method.

8 Claims, 2 Drawing Sheets

(56) References Cited

U.S. PATENT DOCUMENTS

| | | | |
|---|---|---|---|
| 2008/0078169 A1* | 4/2008 | Ishibashi | F02D 41/401 60/287 |
| 2008/0163610 A1* | 7/2008 | Baird | F02D 41/0245 60/295 |
| 2009/0019838 A1* | 1/2009 | Marlett | F02D 41/029 60/287 |
| 2010/0024391 A1* | 2/2010 | Frazier | F02D 41/024 60/274 |
| 2015/0285173 A1* | 10/2015 | Lundstedt | F02D 41/029 701/102 |
| 2016/0032850 A1* | 2/2016 | Sunley | F02D 41/027 60/274 |

* cited by examiner

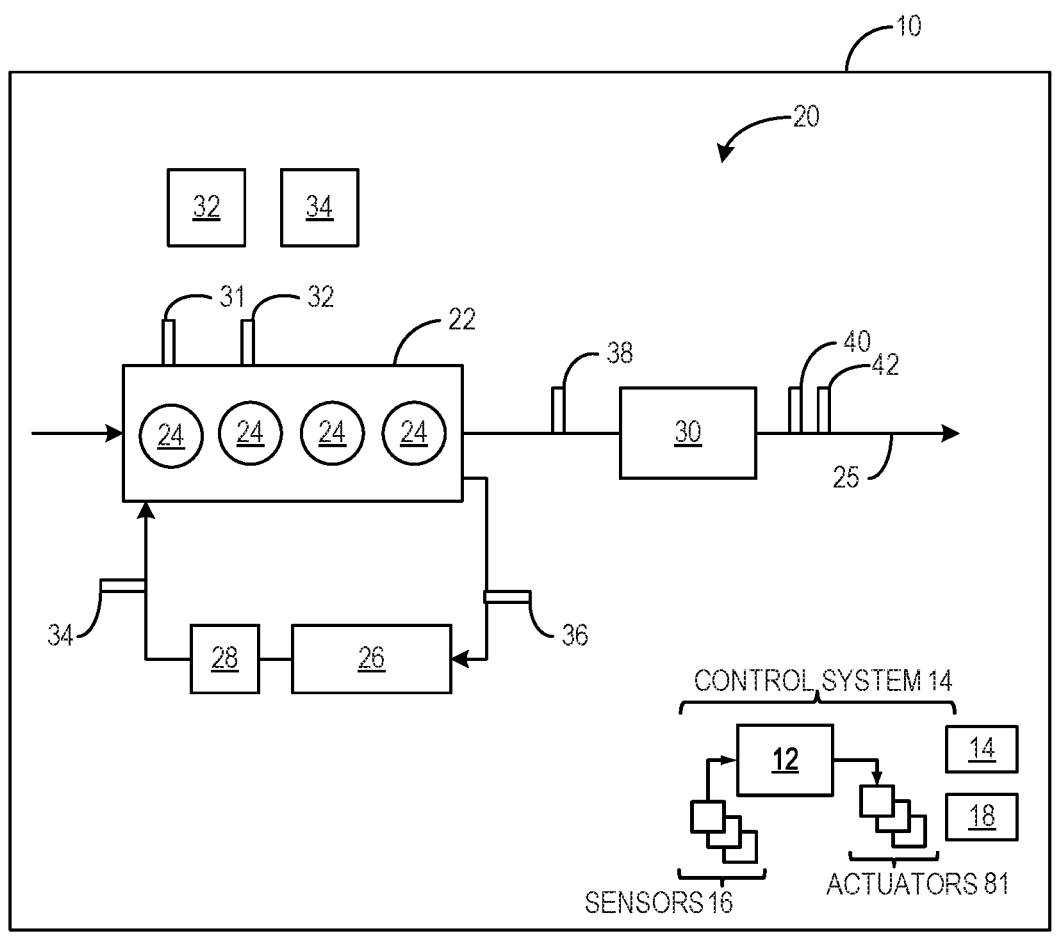

METHOD OF OPERATING A DRIVE OF A MINING MACHINE AND MINING MACHINE

CROSS REFERENCE TO RELATED APPLICATION

The present application claims priority to German Application No. 10 2018 103 760.0 entitled "METHOD OF OPERATING A DRIVE OF A MINING MACHINE AND MINING MACHINE," filed Feb. 20, 2018. The entire contents of the above-listed application are hereby incorporated by reference in their entirety for all purposes.

TECHNICAL FIELD

The disclosure relates to a method of operating a drive of a mining machine, in particular of a mining excavator, a mining loader, or a mining tipper, comprising at least one diesel engine and at least one exhaust gas purification device. The disclosure is further directed to a corresponding mining machine that can be operated in accordance with the method.

BACKGROUND AND SUMMARY

Mining machines and methods of operating them are known in previous disclosures in which an exhaust after treatment of exhaust gases takes place that are emitted by a diesel engine of the mining machine.

The exhaust gas systems of, for example, diesel engines of the "Tier 4" generation can comprise an exhaust gas purification device such as an SCR device (selective catalytic reduction) that converts NOx gases into nitrogen and steam. At low operating temperatures, non-combusted hydrocarbon deposits can remain on the catalysts used in this process. These deposits oxidize over time and can form soot. These soot deposits can in turn result in a clogging of a particle filter and thereby to a reduction in the efficiency of the exhaust gas purification device or even to its destruction.

A method of operating an internal combustion engine is known from U.S. Pat. No. 9,032,717 B2 in which a diesel particulate filter is heated, with a regeneration taking place by a post-injection of fuel into the exhaust gases.

U.S. Pat. No. 8,230,679 B2 describes a method of operating an internal combustion engine in which the exhaust temperature can be increased by influencing the engine performance. The document concentrates solely on the engine control, with relevant parameters of an exhaust gas purification device and of a radiator circuit being left out of account.

Against this background, it is the object of the present disclosure to provide an improved method of operating the drive of a mining machine and to provide a corresponding mining machine, wherein in particular the contamination of the exhaust gas purification device can be reduced.

This object is achieved in accordance with the disclosure by a method and by a mining machine, as disclosed herein.

A method of operating a drive of a mining machine is accordingly provided, wherein the mining machine can in particular be a mining excavator, a mining loader, or a mining tipper. In accordance with the method, a mining machine is operated by at least one diesel engine and at least one exhaust gas purification device. The method comprises:
  determining the coolant temperature of the diesel engine;
  determining the speed of the diesel engine;
  determining the contamination of the exhaust gas purification device by soot and/or non-combusted hydrocarbons; and
  setting a new speed of the diesel engine greater than its idling speed in dependence on the determined values.

It is possible by setting a new speed, in particular a higher speed, to carry out a purification procedure of the exhaust gas purification device that is also described as regeneration. This purification procedure can comprise the raising of the temperature of a catalyst that can be part of the exhaust gas purification device. Non-combusted hydrocarbons are removed from the surface of the catalyst by the raising of the temperature and concentrated soot deposits are oxidized in the exhaust gas purification device or in the SCR device.

It is conceivable in an embodiment of the disclosure that the speed of the diesel engine is set to a predefined speed, possibly of approximately 1200 r.p.m. The speed value is to be understood as an approximate, exemplary value that is above a normal idling speed. The new speed value can be, for example, between 1100 and 1300, between 1000 and 1400, or between 900 and 1500 revolutions per minute.

The non-combusted hydrocarbons can be any non-combusted fuel residues that were not fully combusted in the combustion process taking place in the diesel engine and that can therefore be deposited in the downstream exhaust gas duct of the diesel engine.

Unlike previous methods in which exhaust throttle valves are, for example, used for the purification of exhaust gas purification devices, the present disclosure allows the regeneration of exhaust gas purification devices or SCR devices and/or their filters to be effected without the use of additional or supplementary mechanical components, with the temperature of the catalyst also being able to be set without a direct intervention of a user or of an operator of the corresponding device.

It is conceivable in a further embodiment of the disclosure that the new speed of the diesel engine is set when the coolant temperature is lower than a predefined temperature and is, in some examples, higher than 50° C. This threshold temperature is to be understood as an exemplary value.

It can hereby advantageously be ensured that the method in accordance with the disclosure is not carried out in a state of the diesel engine that is too cold and that thereby disadvantages are involuntarily effected in the operation of the diesel engine.

It is conceivable in a further embodiment of the disclosure that the new speed of the diesel engine is set when the initially determined speed of the diesel engine is a predefined idling speed, possibly of approximately 800 revolutions per minute. This threshold value of approximately 800 r.p.m. is not to be understood as restrictive and can comprise values between 700 and 900, and further may comprise values between 600 and 1000 r.p.m.

If a speed is determined that corresponds to an idling speed, a regeneration or purification of the exhaust gas purification device can be carried out under the given circumstances by the raising to the new speed for which otherwise sufficient thermal energy would not be available in the range of the low idling speed.

It is conceivable in a further embodiment that the new speed of the diesel engine is set when the determined contamination exceeds a settable threshold value. The settable threshold value or also the settable threshold values can here be compared with the determined values of the contamination and this comparison can be used as a regulation criterion for carrying out the method in accordance with the disclosure. Two different threshold values can in particular be used, one for the contamination with soot and the other for the contamination with non-combusted hydrocarbons. A large number of methods and apparatus are known from the prior art for the determination of the contamination that do not themselves represent the core of the disclosure and to which reference is therefore only marginally made.

It is conceivable in a further embodiment that the determined contamination with soot and/or non-combusted hydrocarbons is displayed. A corresponding display device can be provided for this purpose that displays the current degree of contamination to an operator. It is alternatively or additionally possible on the basis of this display that an operator triggers or controls the method in accordance with the disclosure by a manual control signal. The triggering or control can take place manually or alternatively thereto automatically. A corresponding input device can be provided for this purpose to input a corresponding control signal.

It is conceivable in a further embodiment that the setting of the new speed is ended when the determined contamination is close to or at 0% and/or when a user of the mining machine manually changes the speed of the diesel engine.

The method in accordance with the disclosure may run repeatedly or in a loop so that the parameters determined therein are determined continuously or repeatedly. The method can also continue to be carried out after a new speed has been set. It can be determined whether the contamination falls or reaches a sufficiently low value after which the setting of the new speed can be ended and, for example, an old speed or a new speed can be set.

It is also conceivable that the method furthermore comprises determining the exhaust gas temperature of at least one portion of the diesel engine.

It is conceivable in a further embodiment that the determination of the contamination and/or the setting of the new speed takes place automatically or manually, with provision in particular being made that this is enforced by a manual actuation in a servicing phase of the mining machine.

The at least one portion of the diesel engine can, for example, be a partial region, some of the cylinders, or another subsection of the diesel engine. It can in particular be a subsection of the diesel engine that has an exhaust gas routing that is at least partially separate from the rest of the diesel engine.

The exhaust gas temperature and/or the further determined parameters such as the coolant temperature, the speed and/or the contamination of the exhaust gas purification device can also accordingly relate to a respective such subsection of the diesel engine or of the corresponding auxiliary unit. Said parameters can thus be determined separately for two or more subsections of the diesel engine or subsections of devices coupled to the engine and can also be compared with one another. Further regulation options can result from these comparisons of the parameters.

It is conceivable in a further embodiment that the method furthermore comprises: setting at least one hydraulic pump and/or at least one fan of the diesel engine to full operating power. This setting of the hydraulic pump and/or of the fan can take place under the same conditions as the setting of the new speed. In addition to the fan and a hydraulic pump such as a coolant pump, further auxiliary units of the engine such as a hydraulic system of the mining machine can be regulated/controlled alternatively or additionally in dependence on the determined parameters. An increase in the operating temperature then takes place here when the power of the hydraulic system is increased. In the case of a V engine having two cylinder banks, the two banks can be separated individually. If only a single bank is operated that can in turn be operated at a higher power output, the operating temperature increases to a higher degree, which serves the regeneration in accordance with the disclosure. The choice of the operated bank can depend on the exhaust line to be purified.

The disclosure is further directed to a mining machine, in particular to a mining excavator, a mining loader, or a mining tipper, that is configured to be operated in accordance with the method—disclosed herein.

BRIEF DESCRIPTION OF DRAWINGS

Further details and advantages of the disclosure are explained with reference to the embodiment shown in the only Figure.

FIG. 2 shows a schematic of an embodiment of a mining machine.

DETAILED DESCRIPTION

Figure 1:
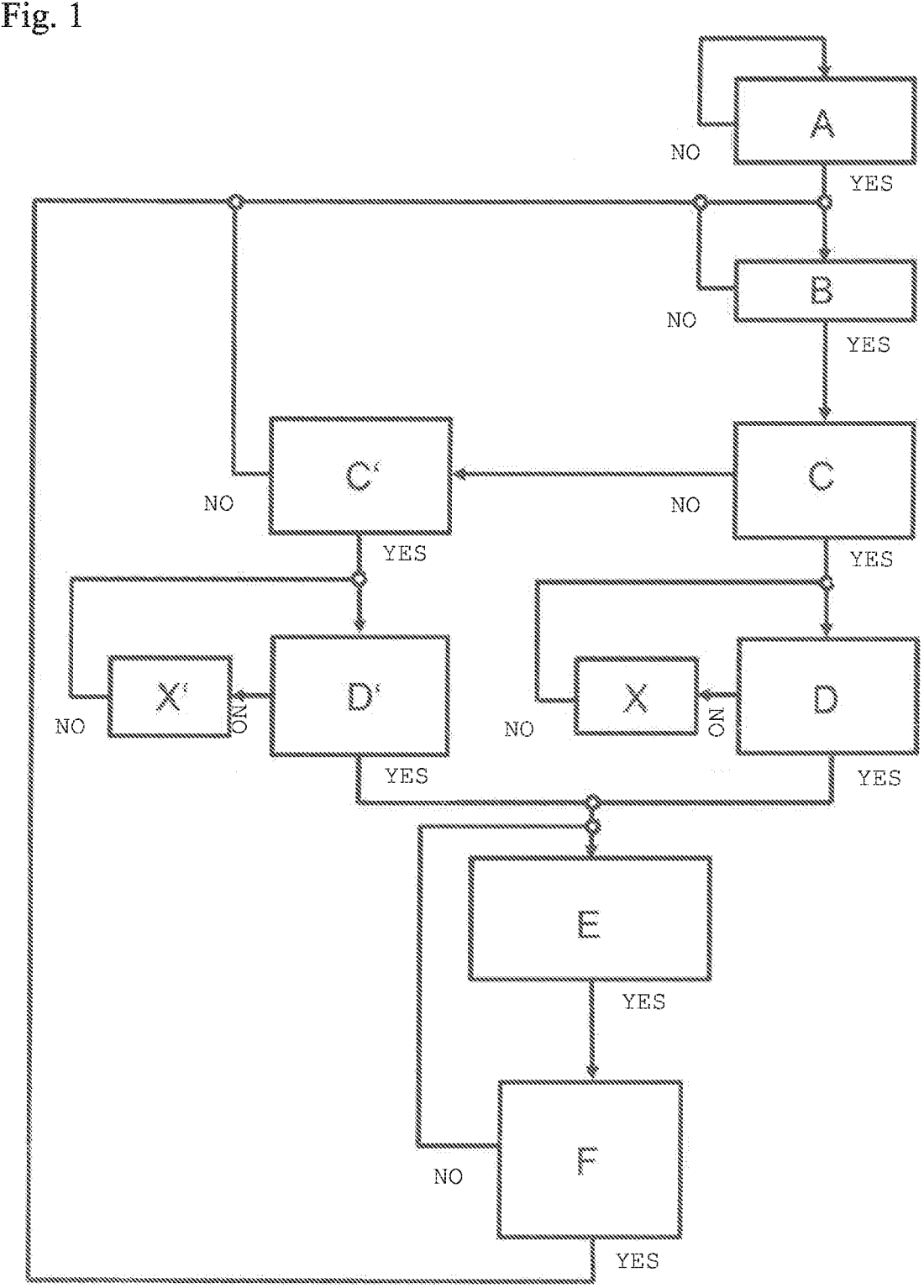
FIG. 1 shows a schematic routine of a method in accordance with the disclosure of operating a drive of a mining machine having at least one exhaust gas purification device.

Corresponding exhaust gas purification devices can be contaminated in the course of their operation. Different routines can take place in the exhaust gas purification device in dependence on the temperature. Non-combusted carbons can be absorbed or adsorbed by the surface of a catalyst below 200° C. Soot can be formed in the exhaust gas purification device between 170° C. and 270° C. No non-combusted hydrocarbons can be deposited in a neutral zone between 200° C. and 250° C. and nor can any regeneration of the exhaust gas purification device take place. A regeneration of the non-combusted hydrocarbons can take place above 250° C. A regeneration of soot can take place above 350° C. The exhaust gas purification devices therefore may be purified in a temperature range of more than 250° C.

In accordance with the disclosure, as shown in FIG. 1, a determination is made in a first step A whether a coolant temperature of a diesel engine of the mining machine is above a predefined value of, for example, 50° C. Different or slightly deviating temperatures of between 45° C. and 55° C. or between 40° C. and 60° C. can also be considered as threshold values here. If this is not the case, step A is repeated until it is the case and a next step B is carried out.

A determination is made in the second step B of the initial speed of the diesel engine, which may include determining whether the diesel engine is operated at an idling speed of approximately 800 r.p.m. If the criteria checked in the two steps A, B apply or are present, a determination can be made in a next step C whether the contamination of the exhaust gas purification device with soot and/or non-combusted hydrocarbons is above specific threshold values such as 20% or 50% or above other threshold values. This determination can take place separately for two or more subsections of the diesel engine. The determined values or contaminations can accordingly also be compared or looked at separately from one another in the individual portions of the diesel engine.

If it is, for example, determined that the contamination values determined in a first subsection of the diesel engine in step C are not above the predetermined values, a determination can then be made in a second subsection of the diesel engine in step C' whether the corresponding contamination values exceed the predetermined values in this subsection. If this likewise does not apply, the method can return to step B. If the contamination values determined in one of the steps C, C' are above the predetermined values, steps D, D' can be carried out to determine the exhaust gas temperatures in the respective subsections of the diesel engine. The steps D, D' can alternatively also be omitted or skipped and step E described further below can be directly carried out.

The respective subsection of the diesel engine can be examined more closely with respect to its exhaust gas temperature in dependence on the portion of the diesel engine in which the first three criteria are satisfied, that is, in which the coolant temperature is above a threshold value, the speed of the diesel engine is in the range of a first speed, and the contamination with soot and/or non-combusted hydrocarbons is above specific threshold values. The new speed of the diesel engine can then be set in a step E as a response to the criteria A to C depending on whether the exhaust gas temperature in one portion of the diesel engine is greater or is the greatest or is, for example, more than 10° C. higher than in the other subsections of the engine. Or other settings can be carried out at the respective subsection in steps X, X'. The other settings can be the deactivating of a bank or the separation of the banks in the case of a V engine or of another engine having two cylinder bank. Steps X, X' can also be omitted or skipped like steps D, D'.

In addition, in step E, the hydraulic pump and the fan can also be set to a maximum operating power or other auxiliary units for improving the regeneration of the exhaust gas purification device can be set.

If it is found in the further course of the method that the contamination with soot and/or non-combusted hydrocarbons is at 0% or is lower than a threshold value and/or if it is found that an operator is manually influencing the speed of the diesel engine, the at least partial automatic setting of the new speed in accordance with the method can be interrupted in a step F. Alternatively to this, the setting of the new speed and the operation of the hydraulic pump and of the fan can continue to be maintained at 100% or at 1200 r.p.m.

A result of the operation of the hydraulic pump and of the fan at maximum operating powers and the setting of the speed of the diesel engine 1 to 1200 r.p.m. is an increase in the exhaust gas temperature. An operator of the mining machine or a person who carries out the driving in accordance with the disclosure can monitor the degree of contamination of the exhaust gas purification device. If the degree of contamination reaches a specific critical level, the operator can end a work process such as an excavation process of the machine and/or can switch the machine to idling operation so that the method in accordance with the disclosure can be carried out.

FIG. 2 shows a schematic of a mining machine 10, such as the mining machine discussed above with reference to FIG. 1. As explained above, the mining machine 10 may be one of a mining excavator, a mining loader, or a mining tipper. The mining machine 10 includes a drive 20 for propelling the mining machine. The drive 20, and thus the mining machine 10, may include a diesel engine 22 and an exhaust gas purification device 30 arranged in and/or coupled to an exhaust passage 25 of the diesel engine 22. The diesel engine 22 may include a plurality of cylinders 24. The diesel engine may receive coolant (e.g., engine coolant) from a coolant system including a coolant pump 28 and/or a heat exchanger 26 adapted to cool the coolant (e.g., a radiator). A coolant sensor 34 and/or coolant sensor 36 may be arranged in a coolant passage of the coolant system and adapted to measure a temperature of coolant flowing through the coolant system (and to/from the diesel engine 22). An engine speed sensor adapted to measure a speed of the engine (e.g., RPM) may be coupled to the diesel engine 22. Additionally, the diesel engine 22 may include an engine temperature sensor 31 adapted to measure the temperature of the engine. However, in alternate embodiments, the engine temperature may be estimated based on the coolant temperature sensor 36 (e.g., coolant exiting the engine).

The exhaust gas purification device 30 may include one or more components, such as various catalysts, filters, and the like. There may be one or more exhaust gas temperature sensors arranged upstream (as shown by exhaust gas temperature sensor 38) and/or downstream (as shown by exhaust gas temperature sensor 40) of the diesel engine 22. Additionally, a contamination sensor 42 adapted to measure the contamination of the exhaust gas purification device 30 may be arranged directly downstream of the exhaust gas purification device 30. However, in alternate embodiments, the contamination sensor 42 may be directly coupled to the exhaust gas purification device 30. In one embodiment, the contamination sensor 42 may be adapted to measure a concentration or level of soot and/or non-combusted hydrocarbons at the exhaust gas purification device 30. The mining machine may further include a hydraulic pump 32 (including or in addition to the coolant pump 28) and/or fan 34.

The mining machine 10 may be controlled at least partially by a control system 14 including controller (e.g., electronic controller) 12. Controller 12 may receive various signals from sensors 16 coupled to diesel engine 22 and/or drive 20, and send control signals to various actuators 81 coupled to the engine 22 and/or mining machine 10. The various sensors may include, for example, various temperature, pressure, speed, and contamination sensors, such as those discussed above with reference to FIG. 2. The various actuators may include, for example, various valves, throttles, fuel injectors, and the like. Controller 12 may be a microcomputer, including a microprocessor unit, input/output ports, an electronic storage medium for executable programs and calibration values. Controller 12 may be programmed with computer readable data representing instructions executable to perform the methods described herein (such as those presented above with reference to FIG. 1) as well as other variants that are anticipated but not specifically listed. The control system 14 may further include and/or be in electronic communication with a display 14 and manual input device(s) 18 of the mining machine 10. For example, the mining machine 10 may include an operator portion, where an operator may reside to manually control the mining machine 10, and the display 14 and/or manual input device(s) 18 may be located in this oeprator portion. The display 14 and/or manual input device(s) may then be in direct electronic communication with the controller 12. In one embodiment, the determined contamination with soot and/or non-combusted hydrocarbons is displayed via the display 14 according to the signals received at the controller 12 from the various sensors 16.

The control methods and routines disclosed herein may be stored as executable instructions in non-transitory memory and may be carried out by the control system including the controller in combination with the various sensors, actuators, and other system hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A mining machine, being one of a mining excavator, a mining loader, or a mining tipper, the mining machine comprising:
 a diesel engine;
 at least one exhaust gas purification device; and
 a controller including instructions stored in memory that when executed during operation of the mining machine cause the controller to:
  determine a coolant temperature of the diesel engine;
  determine an initial speed of the diesel engine;
  determine a contamination of the exhaust gas purification device by soot and/or non-combusted hydrocarbons; and
  set a new speed of the diesel engine greater than its idling speed in dependence on the determined coolant temperature, initial speed, and contamination.

2. The mining machine of claim 1, further comprising a display and wherein the instructions further cause the controller to display the determined contamination of the exhaust gas purification by soot and/or non-combusted hydrocarbons.

3. The mining machine of claim 1, wherein the setting of the new speed is ended when the determined contamination is close to or at 0% and/or when a user of the mining machine manually changes the speed of the diesel engine.

4. The mining machine of claim 1, wherein the determination of the contamination and/or the setting of the new speed takes place automatically or manually, by a manual actuation in a servicing phase of the mining machine.

5. The mining machine of claim 1, further comprising at least one hydraulic pump and/or at least one fan.

6. The mining machine of claim 5, wherein the controller further includes instructions stored in memory that when executed during operation of the mining machine cause the controller to:
 set the at least one hydraulic pump and/or the at least one fan of the mining machine to full operating power.

7. The mining machine of claim 1, wherein a contamination sensor is arranged downstream of the exhaust gas purification device.

8. The mining machine of claim 1, wherein a contamination sensor is directly coupled to the exhaust gas purification device.

* * * * *